414-146 SR
M102A XR 2,873,160
[redacted]
1

INVENTOR
Samuel S. Board Jr.
BY Rockwell & Bartholow
ATTORNEYS

Feb. 10, 1959 S. S. BOARD, JR 2,873,160

STORAGE MECHANISMS FOR RADIOACTIVE MATERIAL

Filed Aug. 15, 1956 8 Sheets-Sheet 2

INVENTOR

Samuel S. Board Jr.

BY Rockwell & Bartholow

ATTORNEYS

STORAGE MECHANISMS FOR RADIOACTIVE MATERIAL

Filed Aug. 15, 1956 8 Sheets-Sheet 3

INVENTOR

Samuel S. Board Jr.

BY Rockwell & Bartholow

ATTORNEYS

Feb. 10, 1959 S. S. BOARD, JR 2,873,160

STORAGE MECHANISMS FOR RADIOACTIVE MATERIAL

Filed Aug. 15, 1956 8 Sheets-Sheet 4

INVENTOR

Samuel S. Board Jr.

BY Rockwell & Bartholow

ATTORNEYS

INVENTOR
Samuel S. Board Jr.
BY Rockwell & Bartholow
ATTORNEYS

Feb. 10, 1959 S. S. BOARD, JR 2,873,160

STORAGE MECHANISMS FOR RADIOACTIVE MATERIAL

Filed Aug. 15, 1956 8 Sheets-Sheet 6

INVENTOR
Samuel S. Board Jr.
BY Rockwell & Bartholow
ATTORNEYS

STORAGE MECHANISMS FOR RADIOACTIVE MATERIAL

Filed Aug. 15, 1956 8 Sheets-Sheet 7

INVENTOR

Samuel S. Board Jr.

BY Rockwell & Bartholow

ATTORNEYS

INVENTOR
Samuel S. Board Jr.
BY Rockwell - Bartholow
ATTORNEYS 2,873,160
Patented Feb. 10, 1959

2,873,160

STORAGE MECHANISMS FOR RADIOACTIVE MATERIAL

Samuel S. Board, Jr., Snyder, N. Y., assignor to Farrel-Birmingham Company, Incorporated, Ansonia, Conn., a corporation of Connecticut Application August 15, 1956, Serial No. 604,217

10 Claims. (Cl. 312—268)

This invention relates to a storage device for radioactive or like materials, and particularly to a storage mechanism which is so constructed that the radioactive material may be properly shielded and at the same time made readily available for use.

As illustrated, the mechanism is mounted in a pit under ground and covered by a shielding plate. The material may be contained in a plurality of separate containers carried by an endless chain which is guided over a tortuous path in the pit whereby the maximum storage capacity is obtained.

In addition means is provided to bring the various flights of containers of radioactive material to a delivery point at which a slide or cover may be opened and a selected container removed. Also indicating means is provided which will indicate to the operator the particular flight of containers which has been brought opposite the delivery opening in order that the proper container may be brought to a point where it is available for removal without fail.

Additionally the various flights of containers are supported by endless belts or chains, and these chains are directed over vertical paths so that the containers may be of a variety of lengths or heights, if desired, so that the capacity of the containers themselves may be varied. Notwithstanding that the length of the containers may be varied, the indicator will still accurately show the particular containers which stand opposite the delivery opening at any given time.

One object of the present invention is to provide mechanism of improved form for the storage of radioactive or other material which requires shielding.

A further object of the invention is to provide a mechanism for the storage of radioactive materials wherein the material is carried in containers supported by endless belts or chains which are directed over tortuous or winding paths principally in vertical planes, and mechanism is provided to drive these conveyor chains to bring a selected flight of containers opposite a delivery opening in the cover of the pit in which the mechanism is contained.

Still another object of the invention is to provide a storage mechanism for radioactive materials of the class described wherein indicating means is provided to correctly indicate the particular containers which stand opposite the delivery opening at a given time, these indicators being driven by the movement of the flights of containers.

To these and other ends the invention consists in the novel features and combinations of parts to be hereinafter described and claimed.

To illustrate one embodiment of my invention, I have illustrated a storage mechanism mounted in a pit 10 preferably under ground although it might be a shielded vat or the like above ground. This pit is closed at the top by a relatively thick shielding cover 11.

Within the pit is a frame structure comprising a pair of side walls 12 and 13 (Fig. 3), these walls being secured together at their ends by cross braces 14 so that they will form a support or frame for the endless belt structure to be presently described. This frame is supported or suspended from the top cover 11 to which it may be welded, the top plate being made of a suitable thickness of shielding material such as Meehanite. The plate is supported at its ends from the end walls of the pit, as shown in Fig. 2, and may also be supported on the side walls where these side walls are not interrupted for the drive mechanism, as indicated in Fig. 3.

Figure 2:
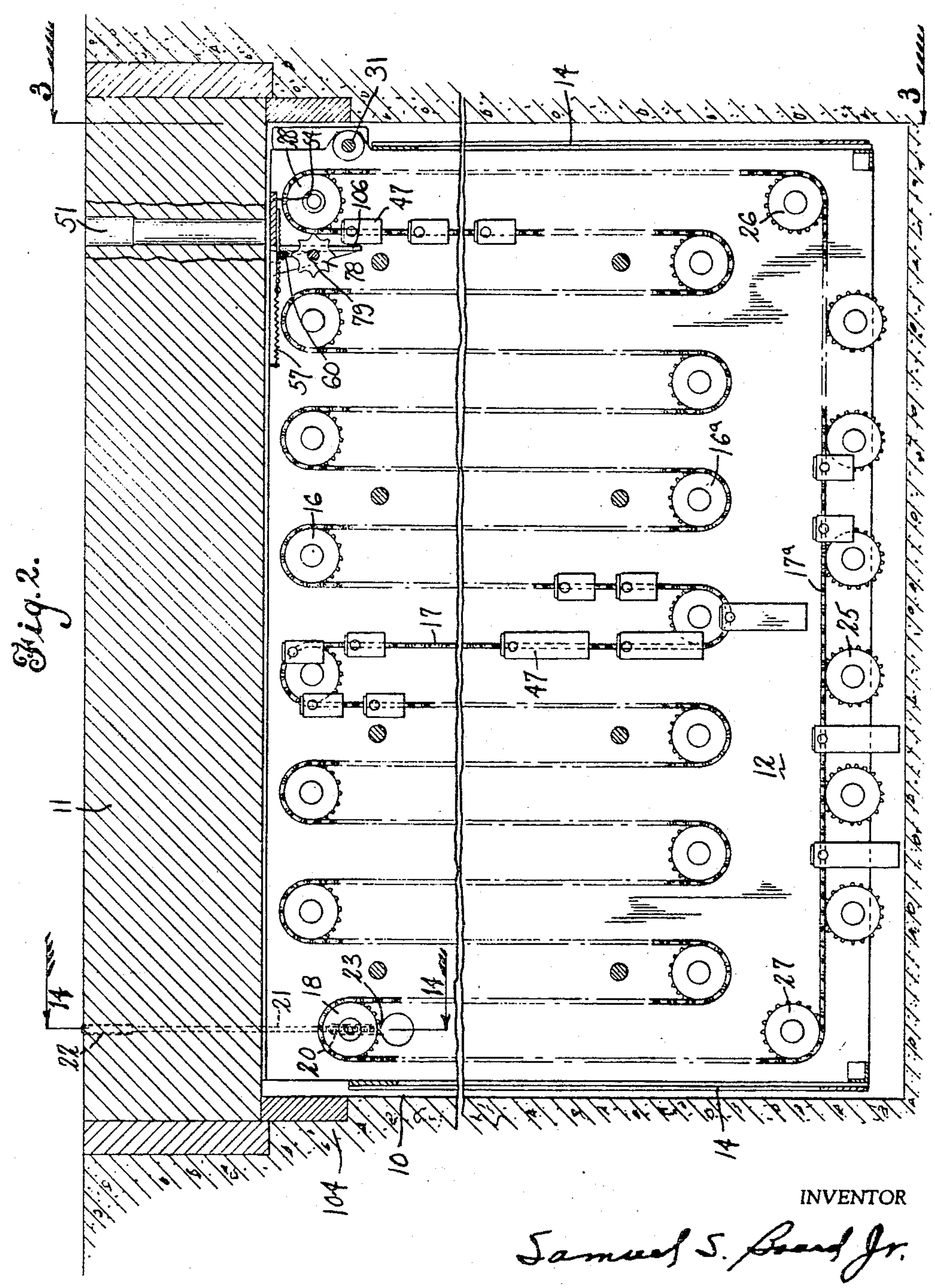
Fig. 2 is a longitudinal sectional view of the mechanism on line 2—2 of Fig. 1.
Figures 3, 14, 15:
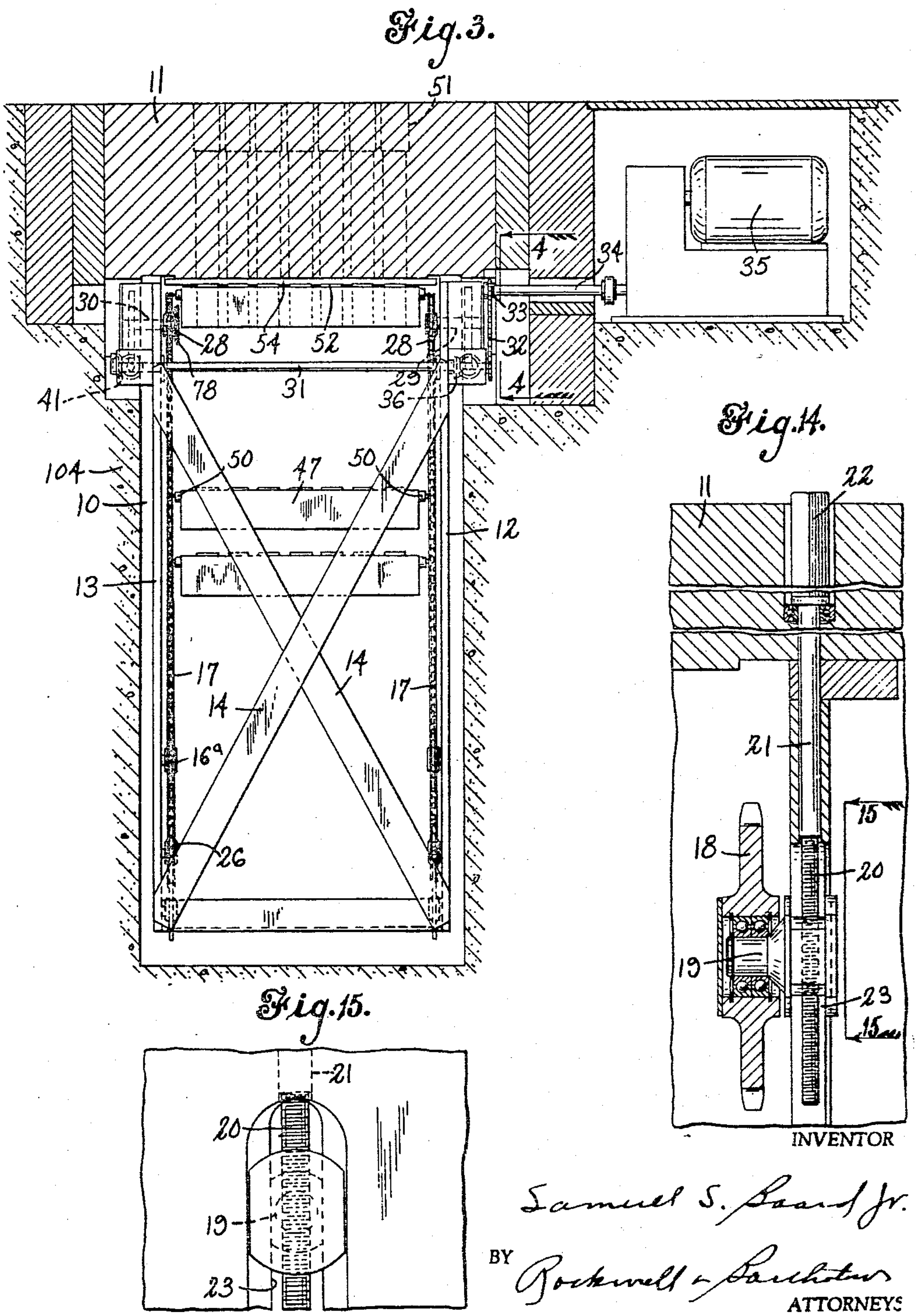
Fig. 3 is a transverse sectional view on line 3—3 of Fig. 2.
Fig. 14 is a sectional view of the mechanism for tensioning the endless chain or belt, the section being taken on line 14—14 of Fig. 2.
Fig. 15 is an elevational view looking in the direction of the arrows 15—15 of Fig. 14.

Rotatably mounted on the side walls 12 and 13 of the frame structure are a plurality of idler sprockets 16 and 16[a] over which are trained endless chains 17, there being one of these chains adjacent each of the side walls 12 and 13, as shown in Fig. 3. It will be noted from Fig. 2 that the sprocket wheels 16 are in horizontal alignment at the upper end of the frame, while the sprocket wheels 16[a] are in horizontal alignment at a lower point on the frame and are staggered with respect to the sprockets 16 so that the runs or flights of the chains 17 between the sprocket wheels 16 and 16[a] are vertical. At one end of the frame the sprocket wheels 18 over which the chains are directed are adjustable, as shown in Figs. 14 and 15, these wheels being mounted on stub shafts 19 which threadedly receive the screw-threaded portion 20 of a rod 21, the upper squared end 22 of which projects above the plate 11 so that a wrench may be applied thereto for turning the rods and adjusting the wheels 18 to regulate the tension of the chain. The stub shafts 19 are mounted in a slot 23 in the side walls, as shown in Fig. 2.

Lower horizontal flights 17[a] of the endless chains 17 are supported upon a horizontal row of sprockets 25 mounted adjacent the lower edges of the frames 12 and 13, the chains passing over corner sprockets 26 and 27 also adjacent the lower end of the side frames but at a level above the sprockets 25.

Means are provided for driving one of the sprockets at each side of the frame, these driven sprockets being designated at 28, Figs. 2 and 3, it being understood that the remainder of the sprockets are idlers. To this end the sprockets 28 are mounted upon short shafts 29 and 30, one of which is disposed at each side of the frame and projects outwardly therefrom, as shown in Fig. 3. A shaft 31 is rotatably mounted in the side walls 12 and 13 of the frame, this shaft being driven by a sprocket chain 32 (Figs. 3 and 4) which is in turn driven by a sprocket wheel 33 secured upon a shaft 34 driven from a suitable motor 35.

Figure 4:
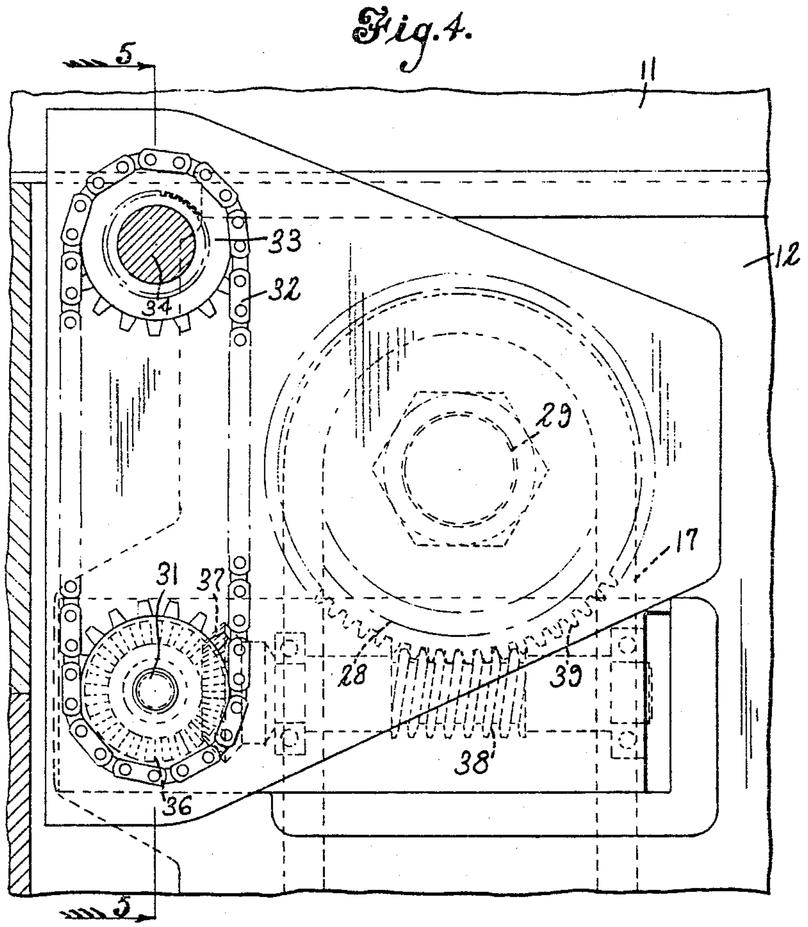
Fig. 4 is a detail sectional view of a portion of the driving mechanism, the section being taken on line 4—4 of Fig. 3.
Figure 16:
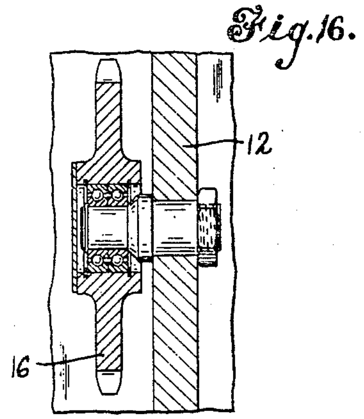
Fig. 16 is a sectional view showing one of the idler sprockets.
Figure 5:
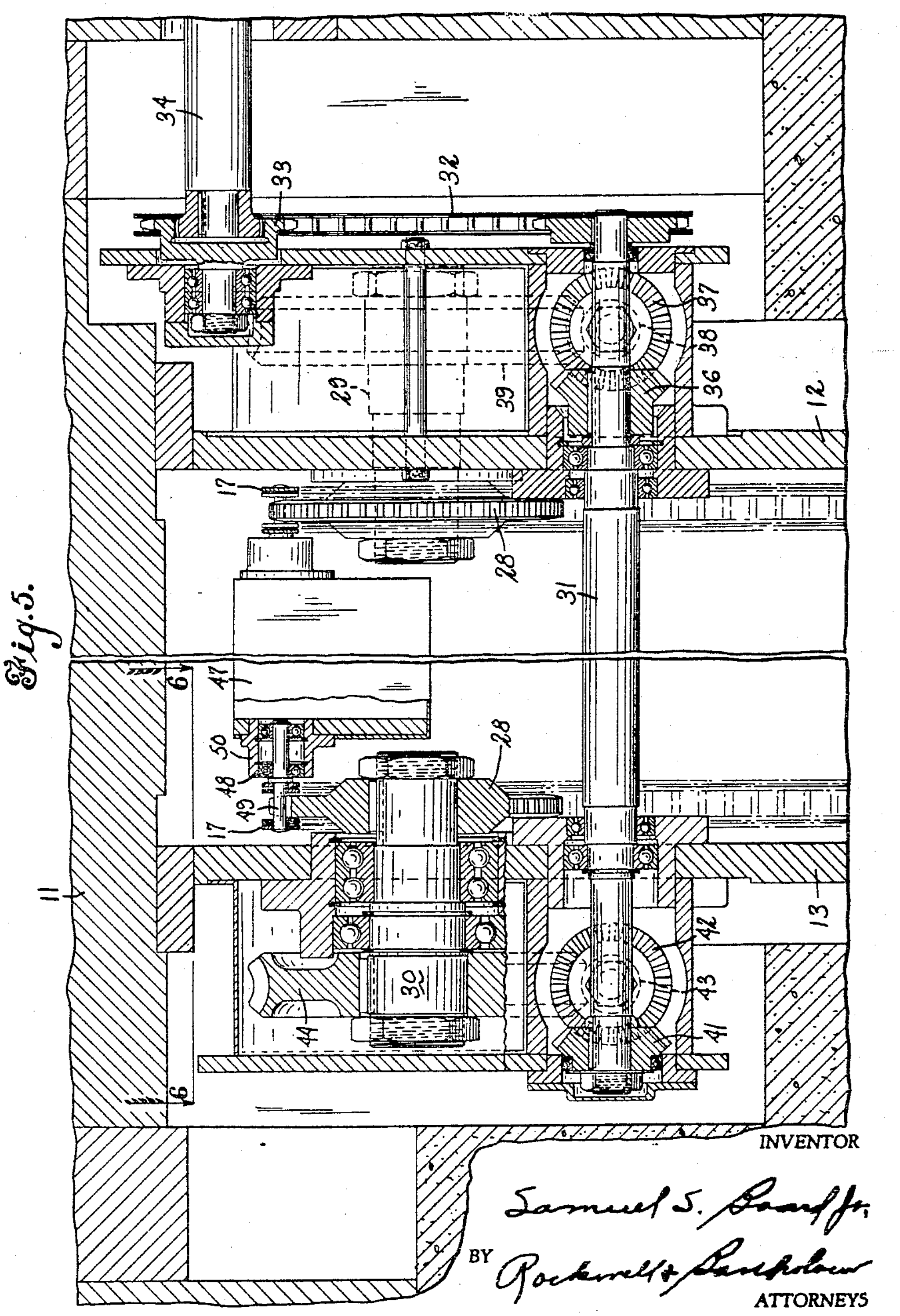
Fig. 5 is a sectional view of the driving mechanism taken at right angles to that of Fig. 4, the section being taken on line 5—5 of Fig. 4.

At each end of the shaft 31 is a driving connection arranged to drive the shafts 29 and 30 from the shaft 31, these connections being shown more particularly in Figs. 4 and 5. Secured adjacent one end of the shaft 31 is a bevel gear 36, meshing with a bevel gear 37 carried by a worm 38 which meshes with a worm wheel 39 secured on the shaft 29 of the sprocket 28 at one side of the frame. At the other end of the shaft 31 a similar arrangement is provided wherein the gear 41 upon the shaft 31 meshes with the gear 42 on a worm shaft 43 meshing with the worm wheel 44 of the shaft 30 which carries the sprocket 28 at that side of the frame.

Figure 1:
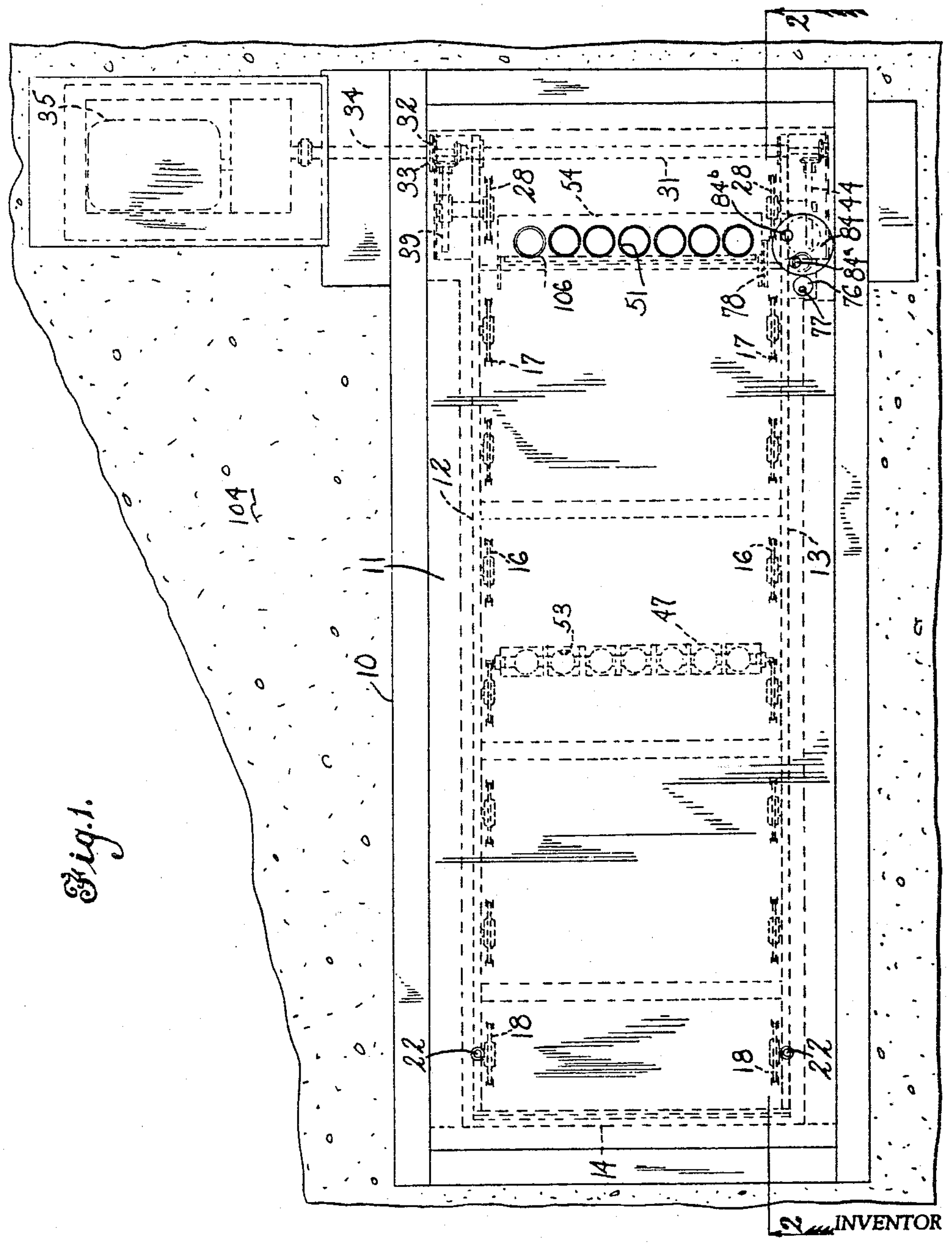
Fig. 1 is a top plan view of a storage device for radioactive materials embodying my invention.

A plurality of trays 47 are suspended between the sprocket chains 17, as shown in Fig. 5, these trays being carried by bearings 48 mounted upon pins 49 carried by the chains, the bearings being disposed in housings or hubs 50 carried by the trays. With this type of suspension the trays may always assume an upright position under the influence of gravity regardless of the direction of the flight of the chain upon which they are carried. As shown in Figs. 1 and 2, a plurality of openings 51 are provided in the shielding cover plate 11 through which may be removed the containers 52 for the radioactive material, the containers being mounted in suitable pockets 53 in the trays 47. The containers are only removed when in the proper position below the openings 51, and there will be one opening for each of the containers carried by one of the trays 47.

The openings 51 are closed by a sliding shutter 54 (Figs. 11 and 12), this shutter being guided between rollers 55 mounted on the side frames 12 and 13 so that it slides smoothly between open and closed position. Secured to the lower surface of the shutter at either side thereof are racks 56, and secured to these rack members are springs 57, the other ends of the springs being secured to pins 58 carried by the cover plate 11 so that the springs normally urge the shutter to a position in which it underlies and closes the openings 51.

Figure 6:
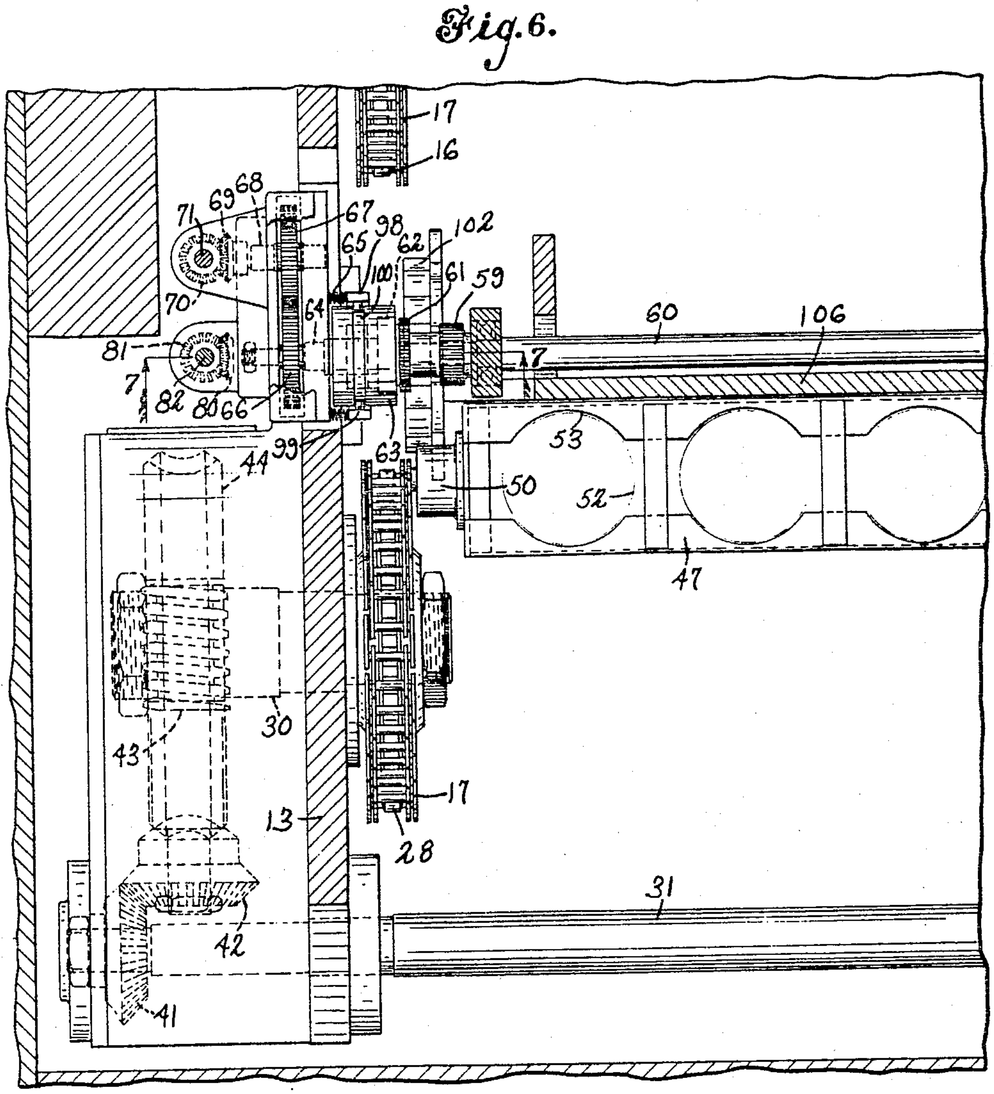
Fig. 6 is a sectional view on line 6—6 of Fig. 5.

Meshing with the teeth of each of the racks 56 is a pinion 59 (Figs. 7 and 11), one at each side of the frame, which pinions are carried by a transversely extending shaft 60. At one end of this shaft is secured a toothed clutch member 61 designed to be engaged by the internal teeth 62 of a clutch member 63 slidably mounted upon a shaft 64 mounted in the frame member 13 coaxially with the shaft 60. Springs 65 normally urge the member 63 to the right, as shown in Fig. 6, so as to engage the clutch teeth 61 and 62 and drive the shaft 60 by rotation of the shaft 64 to move the shutter 54 to open position. Means for disengaging these clutch members will be later described.

Figures 7, 8, 9, 10:
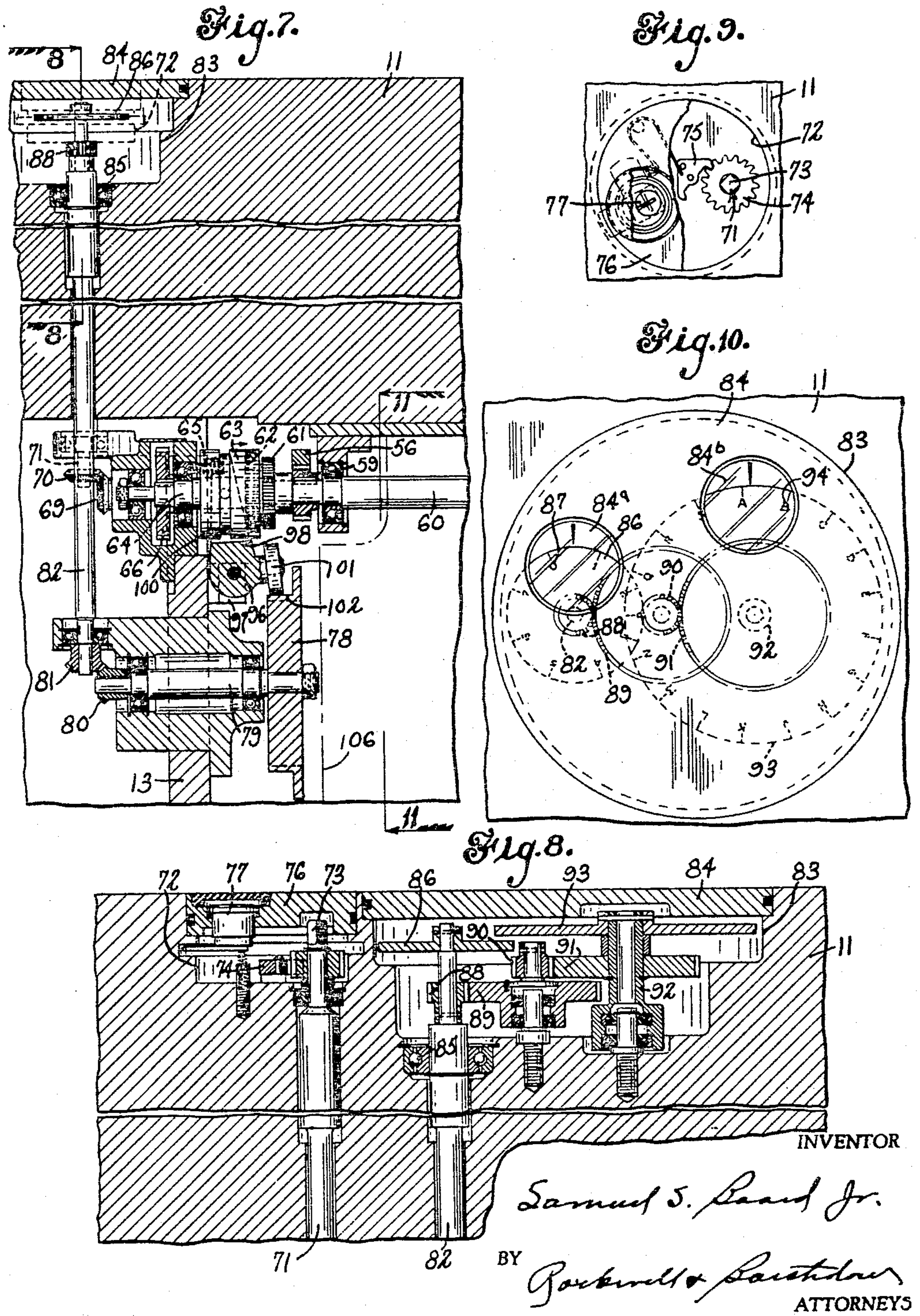
Fig. 7 is a sectional view through the clutch mechanism on line 7—7 of Fig. 6.
Fig. 8 is a further sectional view on line 8—8 of Fig. 7.
Fig. 9 is a top plan view of the mechanism for operating the shutter.
Fig. 10 is a top plan view of the indicating mechanism for indicating the particular flight of containers brought opposite the delivery opening.

On the shaft 64 is a gear 66 meshing with a gear 67 on a short shaft 68 provided with a bevel gear 69, the teeth of which mesh with those of a bevel gear 70 on a vertical shaft 71 (Figs. 6 and 8). As shown in the latter figure, this shaft extends upwardly into a recess 72 in the cover plate and is provided with a noncircular end portion 73 to which a wrench may be applied to rotate the shaft 71 and thereby rotate the shaft 60 to open the shutter. Within the recess 72 the shaft 71 may be provided with a ratchet 74 (Figs. 8 and 9) adapted to be engaged by the tooth of a pawl 75 in order to hold the shutter against being closed by the springs 57 when it has been opened.

The recess 72 is covered by a closure member 76 which may be locked in place by the lock 77 so that only one who is authorized to do so may obtain access to the recess 72 to apply a wrench to the member 73 and open the shuttter 54.

It will be appreciated that it will be desirable to arrange some means for indicating to the operator the particular tray 47 which stands opposite the openings 51 and, if a record is maintained of the particular containers in each of the trays which may be numbered, then the operator will know when the container which it is desired to remove from the device will be in position for such removal. Such an indicating means is provided and will now be described.

Rotatably mounted in the frame 13 is a star wheel 78, this wheel being secured to a shaft 79 which extends through suitable bearings in the frame member 13 and carries on its outer end a gear 80 meshing with a gear 81 on a vertical shaft 82 (Fig. 7). This shaft extends upwardly into a recess 83 in the cover plate 11, which recess is closed by a cover 84 having transparent windows $84^a$ and $84^b$ therein (Fig. 10). The shaft 82 is rotatably mounted in bearings 85 in the cover 11, and secured to the upper end of the shaft is an indicating disk 86 having numerals 87 thereon, as shown in Figs. 8 and 10, a portion of the disk 86 being exposed through the window $84^a$.

Also secured to the shaft 82 within the recess 83 is a pinion 88 which meshes with a gear 89 to which is secured a pinion 90 meshing with a gear 91 on a short shaft 92 rotatably mounted in the cover plate 11 and carrying at its upper end an indicating disk 93 having indicating letters 94 thereon. A portion of the disk 93 is exposed through the window $84^b$.

It will be seen that the gears 88 to 91 are reducing gears so that the disk 86 is driven at a greater speed than the disk 93. As shown there are nine numerals 87 (from 0 to 8) on the disk 86, and it is arranged that this disk will make one revolution while the disk 93 is revolving through an arc between two adjacent letters. If, therefore, the trays 47 are numbered A0, A1, A2, etc., up to A8, and so on with the other letters on the disk 93, the operator may read through the windows $84^a$ and $84^b$ the particular tray which is below the openings 51.

The means for controlling the engagement and disengagement of the clutch element 61—62 may now be described. As shown more especially in Figs. 6 and 7, a bell crank lever is pivoted at 96 to a bracket 97 on the wall 13 of the frame. One arm of this bell crank lever comprises a yoke 98 which embraces the clutch member 63 and is provided with inwardly extending pins 99 received in an annular groove 100 in the clutch member so that when the lever is swung about its pivot, the member 63 will be moved longitudinally of the shaft 60 to engage the clutch elements 61 and 62. It may here be stated that the springs 65 which urge the clutch member to its engaged position act against the yoke 98.

Figure 11:
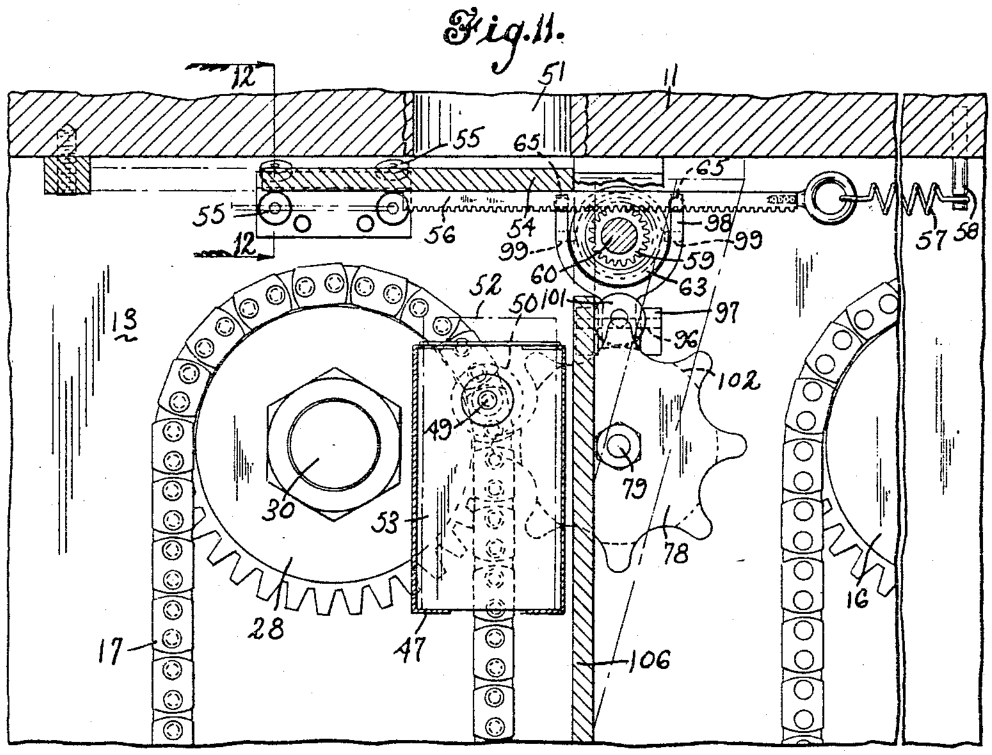
Fig. 11 is a sectional view on line 11—11 of Fig. 7.
Figure 13:
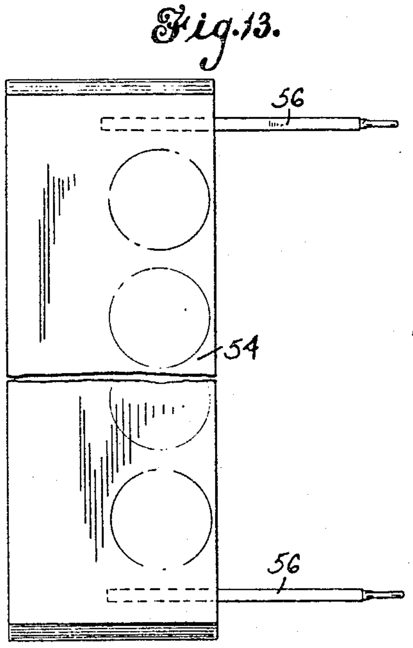
Fig. 13 is a view of the sliding shutter member to close the delivery opening.
Figure 12:
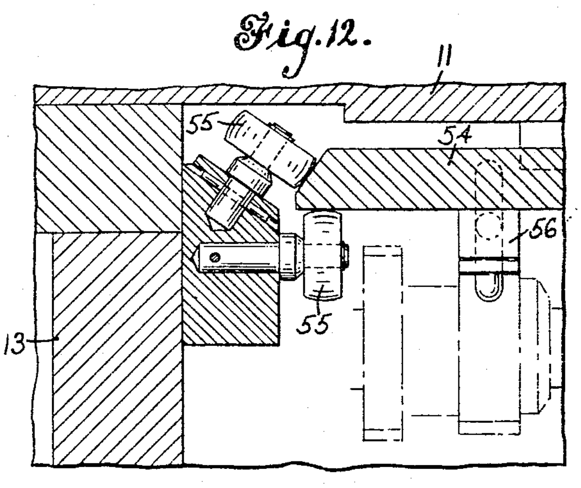
Fig. 12 is a sectional view on line 12—12 of Fig. 11.

On the other arm of the bell crank lever is rotatably mounted a roller 101 adapted to engage a cam surface 102 at the rear face of the star wheel 78. The cam surface 102 is provided with undulations, as shown in dotted lines on Fig. 11, registering with the valleys or undulations between the teeth of the star wheel 78 so that each time the wheel is turned one step by the engagement of the hub members 50 of the trays therewith, as shown in Fig. 6, the cam surface 102 will also be moved from one of the valleys or recesses upon it to another. This will mean that the cam surface is moved through one step each time one of the trays is moved past a position opposite the delivery openings 51. When the star wheel is moved to a position in which the roller 101 is permitted to drop in one of the valleys on the surface 102, springs 65 will engage the clutch teeth 61 and 62 so that the shaft 60 may be rotated by rotation of the shaft 71 to open the shutter 54. As shown in Fig. 11, the tray 47 which is traveling downwardly has not quite reached its final position below the opening 52, and it will be noted that the hub 50 is about to engage or has just engaged one of the teeth of the star wheel 78. Also the roller 101 at this time is resting upon a high point of the cam 102 and the clutch members 61, 62 and disengaged. Upon a slight additional or downward movement of the tray 47, the engagement of the hub 50 with the teeth of the star wheel 78 will rotate the latter through a small arc, at which time the tray 47 will correctly register below the opening 51, and the roller 101 will drop into one of the undulations of the cam surface 102, thus permitting the springs 65 to effect engagement of the clutch members.

At this time the dials 86 and 93 will show that the correct tray is in position to have one or more of the containers removed therefrom, and the movement of the chains 17 carrying the containers will be stopped. The shutter can now be opened, and when the container is removed, the shutter is again closed and the chain set in motion. Movement of the container 47 from this position will rotate the star wheel through another small arc so that the roller 101 will ride upon one of the high points of the cam 102 and again disengage the clutch members 61 and 62 so that the shutter cannot be opened by rotation of the shaft 71. In this manner the opening of the shutter is prevented except when one of the trays is in the proper position.

It will be seen that as the runs of the endless chains 17 carrying the trays are principally vertical, the mechanism, if fully loaded, will be substantially in balance so that it will require a minimum of power to operate it. Likewise, as these runs are vertical, the trays may be made of different depths as shown so that containers of different sizes may be employed if desired. Moreover, if the star wheel 78 is operated by the containers themselves and not by the endless chains, this wheel will be moved to permit opening of the shutter and to operate the indicating dials 86 and 93 only when one of the trays is brought opposite the delivery openings 51. A plate 106 extends transversely of the frame to engage the tray at this point and hold it in position.

By arranging the endless chains in a tortuous path, as shown, over rows of spaced and staggered sprockets, the maximum capacity of the frame or pit is realized.

As shown, the frame with its contained mechanism is mounted in a pit under ground. It can, of course, be above ground and rest on a floor if desired, provided the walls 104, shown in Fig. 2, are of proper shielding material.

While I have shown and described one embodiment of my invention, it will be understood that it is not to be limited to all of the details shown, but is capable of modification and variation within the spirit of the invention and within the scope of the claims.

What I claim is:

1. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, a shutter member movably connected to said cover for closing said openings, manually operated means for moving said shutter to open position, and means responsive to the movement of a tray below the openings to render said manually operated means effective.

2. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, a shutter member movably connected to said cover for closing said openings, means for opening said shutter, said means including a manually operable shaft and clutch means connecting said shaft to the shutter, means normally holding said clutch mechanism disengaged, and means actuated by the movement of a tray to position below said openings for engaging said clutch mechanism.

3. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, a shutter member movably connected to said cover for closing said openings, normally inoperative means to move said shutter to open position, and means controlled by the movement of one of the trays to position below said openings to render said shutter-moving means operative.

4. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, a shutter member movably connected to said cover for closing said openings, means to move said shutter to open position, clutch mechanism connecting said means to the shutter, spring means acting to effect engagement of said clutch mechanism, and means normally holding said clutch disengaged, said holding means being moved to position to permit engagement of the clutch mechanism by said spring upon movement of a tray to position below said openings.

5. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, a shutter member movably connected to said cover for closing said openings, means to move said shutter to closed position, clutch mechanism connecting said means to the shutter, and means to engage and disengage said clutch mechanism including a rotatable cam member actuated by movement of one of said trays to position below said openings.

6. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, a shutter member movably connected to said cover for closing said openings, means to move said shutter to closed position, clutch mechanism connecting said means to the shutter, and means to engage and disengage said clutch mechanism including a rotatable cam member actuated by movement of one of said trays to position below said openings and also including spring means acting to engage said mechanism.

7. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, indicating mechanism on said cover to indicate the arrival of a selected tray below said openings, and means operated by movement of one of said trays below said openings to actuate said indicating mechanism.

8. Storage mechanism for containers of material comprising a shielding chamber having side and end walls and a shielding cover member, a frame within said chamber, a pair of endless chains supported in spaced relation by said frame, tray members extending between said chains and swiveled at their ends to the chains, openings in said cover member through which containers may be inserted into and withdrawn from said trays, means to drive said chains to bring a selected one of said trays below said openings, indicating mechanism on said cover to indicate the arrival of a selected tray below said openings, and means to operate said indicating mechanism, said means comprising a rotatable shaft connected to the indicating mechanism, a star wheel carried by the frame and connected to said shaft, and means on said trays to engage said star wheel and actuate the same.

9. Storage mechanism for containers of material comprising a shielding chamber having side and end walls and a shielding cover member, a frame within said chamber, a pair of endless chains supported in spaced relation by said frame, sprockets rotatably mounted on said side walls over which said chains are trained, tray members extending between said chains and swiveled at their ends to the chains, openings in said cover member through which containers may be inserted into and withdrawn from said trays, means to drive said chains to bring a selected one of said trays below said openings, indicating mechanism on said cover to indicate the arrival of a selected tray below said openings, and means to operate said indicating mechanism, said means comprising a rotatable shaft connected to said mechanism, a star wheel mounted on the frame adjacent one of said sprockets and connected to said shaft, and a hub member on each of said trays adapted to engage and actuate said star wheel.

10. Storage mechanism for containers of material as set forth in claim 5 wherein indicating means is provided on the cover member to indicate the arrival of a selected tray below said opening, and said indicating means being actuated by said rotatable cam member.

References Cited in the file of this patent

UNITED STATES PATENTS

| | | |
|---|---|---|
| 1,871,372 | James | Aug. 9, 1932 |
| 2,530,566 | Clark et al. | Nov. 21, 1950 |
| 2,603,547 | Zook | July 15, 1952 |
| 2,673,779 | Stewart et al. | Mar. 30, 1954 |
| 2,729,531 | Anderson | Jan. 3, 1956 |
| 2,731,160 | Maier | Jan. 17, 1956 |